(12) United States Patent
Harada et al.

(10) Patent No.: US 10,400,137 B2
(45) Date of Patent: Sep. 3, 2019

(54) WATER-REPELLANT AND OIL-REPELLANT COATING COMPOSITION AND TRANSPARENT FILM

(71) Applicant: SUMITOMO CHEMICAL COMPANY, LIMITED, Tokyo (JP)

(72) Inventors: Yoshihiro Harada, Osaka (JP); Sayaka Sakurai, Osaka (JP); Ryu Takeko, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/525,188

(22) PCT Filed: Nov. 9, 2015

(86) PCT No.: PCT/JP2015/081422
§ 371 (c)(1),
(2) Date: May 8, 2017

(87) PCT Pub. No.: WO2016/076245
PCT Pub. Date: May 19, 2016

(65) Prior Publication Data
US 2018/0230331 A1   Aug. 16, 2018

(30) Foreign Application Priority Data

Nov. 12, 2014   (JP) ................. 2014-230153

(51) Int. Cl.
| | | |
|---|---|---|
| C09D 183/08 | (2006.01) | |
| C03C 17/30 | (2006.01) | |
| C09D 7/20 | (2018.01) | |
| C09D 7/63 | (2018.01) | |
| C09D 5/00 | (2006.01) | |
| C09D 5/16 | (2006.01) | |
| C09D 7/40 | (2018.01) | |
| C08K 5/00 | (2006.01) | |
| C08G 77/24 | (2006.01) | |

(52) U.S. Cl.
CPC ............ C09D 183/08 (2013.01); C03C 17/30 (2013.01); C09D 5/00 (2013.01); C09D 5/1606 (2013.01); C09D 7/20 (2018.01); C09D 7/40 (2018.01); C09D 7/63 (2018.01); C03C 2217/76 (2013.01); C08G 77/24 (2013.01); C08K 5/00 (2013.01)

(58) Field of Classification Search
CPC combination set(s) only.
See application file for complete search history.

(56) References Cited

U.S. PATENT DOCUMENTS

| | | |
|---|---|---|
| 2,397,895 A | 4/1946 | Warrick |
| 3,450,672 A | 6/1969 | Merrill |
| 3,634,321 A | 1/1972 | Nugent et al. |
| 4,322,476 A | 3/1982 | Molari, Jr. |
| 4,895,286 A | 1/1990 | DeRosa |
| 5,359,109 A | 10/1994 | Ritscher et al. |
| 6,511,753 B1 | 1/2003 | Teranishi et al. |
| 7,351,477 B2 | 4/2008 | Yamaya et al. |
| 7,785,715 B2 | 8/2010 | Tsumura et al. |
| 2002/0015800 A1 | 2/2002 | Miyamoto et al. |
| 2002/0064663 A1 | 5/2002 | Murphy et al. |
| 2004/0076840 A1 | 4/2004 | Akamatsu et al. |
| 2004/0152825 A1 | 8/2004 | Yamamoto et al. |
| 2005/0227092 A1 | 10/2005 | Yamaya et al. |
| 2007/0009657 A1 | 1/2007 | Zhang et al. |
| 2007/0053062 A1* | 3/2007 | Sasaki ............. G02B 1/111 359/582 |
| 2007/0141305 A1 | 6/2007 | Kasai et al. |
| 2008/0064814 A1 | 3/2008 | Yamamoto et al. |
| 2008/0090004 A1 | 4/2008 | Zhang et al. |
| 2011/0117344 A1 | 5/2011 | Chen et al. |
| 2011/0165808 A1 | 7/2011 | Zimmermann et al. |
| 2013/0340992 A1 | 12/2013 | Akinaga et al. |
| 2015/0021643 A1 | 1/2015 | Kurino et al. |
| 2015/0118502 A1 | 4/2015 | Mitsuhashi et al. |

(Continued)

FOREIGN PATENT DOCUMENTS

| | | |
|---|---|---|
| CN | 103443223 A | 12/2013 |
| EP | 0565743 A1 | 10/1993 |

(Continued)

OTHER PUBLICATIONS

JP 2002 256258 machine translation (2002).*
Syquest Lab (http://www.synquestlabs.com/product/id/27794.html)(date unknown).*
International Search Report (PCT/ISA/210) issued in PCT/JP2015/081422, dated Jan. 19, 2016.
International Search Report (PCT/ISA/210) issued in PCT/JP2015/081504, dated Jan. 19, 2016.
U.S. Office Action, dated Jun. 20, 2018, for U.S. Appl. No. 15/525,177.
Chinese Office Action (including an English translation thereof) issued in the Chinese Patent Application No. 201580059039.3 dated Nov. 1, 2018.
Chinese Office Action (including an English translation thereof) issued in the Chinese Patent Application No. 201580059081.5 dated Oct. 24, 2018.

(Continued)

*Primary Examiner* — Kuo Liang Peng
(74) *Attorney, Agent, or Firm* — Birch, Stewart, Kolasch & Birch, LLP

(57) ABSTRACT

The present invention aims to provide a water-repellant and oil-repellant coating composition which has good water-repellant and oil-repellant characteristics and further improves abrasion resistance, and a transparent film produced therefrom. The present invention is a water-repellant and oil-repellant coating composition comprising a first organic silicon compound (A) in which a fluorine-containing group having a perfluoroalkyl group or a perfluoropolyether group on the free end side thereof and a hydrolyzable group are bonded to a silicon atom thereof, and a second organic silicon compound (B) that is a hydrolyzable silane oligomer or a compound in which a carbon fluoride-containing group and a hydrolyzable group are bonded to a silicon atom thereof and that has a vapor pressure at 100° C. of 1 atm or less.

16 Claims, No Drawings

(56) References Cited

U.S. PATENT DOCUMENTS

| | | |
|---|---|---|
| 2016/0032146 A1 | 2/2016 | Hozumi et al. |
| 2017/0015842 A1 | 1/2017 | Hozumi et al. |

FOREIGN PATENT DOCUMENTS

| | | | |
|---|---|---|---|
| JP | 5-148451 A | | 6/1993 |
| JP | 6-32991 A | | 2/1994 |
| JP | 7-48560 A | | 2/1995 |
| JP | 7-161453 A | | 6/1995 |
| JP | 7-179480 A | | 7/1995 |
| JP | 9-157636 A | | 6/1997 |
| JP | 9-309889 A | | 12/1997 |
| JP | 10-326559 A | | 12/1998 |
| JP | 11-92714 A | | 4/1999 |
| JP | 11-218926 A | | 8/1999 |
| JP | 2000-17229 A | | 1/2000 |
| JP | 2000-80354 A | | 3/2000 |
| JP | 2000-182513 A | | 6/2000 |
| JP | 2000-195415 A | | 7/2000 |
| JP | 2002 256258 | * | 9/2002 |
| JP | 2002-256258 A | | 9/2002 |
| JP | 2004-122106 A | | 4/2004 |
| JP | 2005-120236 A | | 5/2005 |
| JP | 2008-96516 A | | 4/2008 |
| JP | 2008-137858 A | | 6/2008 |
| JP | 2009-521551 A | | 6/2009 |
| JP | 2010-222703 A | | 10/2010 |
| JP | 2010-248468 A | | 11/2010 |
| JP | 2011-111509 A | | 6/2011 |
| JP | 2011-174001 A | | 9/2011 |
| JP | 2012-17394 A | | 1/2012 |
| JP | 2012-046765 A | | 3/2012 |
| JP | 2012-214588 A | | 11/2012 |
| JP | 2013-155375 A | | 8/2013 |
| JP | 2013-173939 A | | 9/2013 |
| JP | 2013-213181 A | | 10/2013 |
| JP | 2013-222836 A | | 10/2013 |
| JP | 2013-249389 A | | 12/2013 |
| JP | 2014-015609 A | | 1/2014 |
| JP | 2014-37548 A | | 2/2014 |
| JP | 5472543 B2 | | 4/2014 |
| JP | 2014-76924 A | | 5/2014 |
| JP | 2014-185334 A | | 10/2014 |
| KR | 10-2006-0045524 A | | 5/2006 |
| TW | 201414769 A | | 4/2014 |
| WO | WO 2010/074264 A1 | | 7/2010 |
| WO | WO 2012/137976 A1 | | 10/2012 |

OTHER PUBLICATIONS

Chinese Office Action (including an English translation thereof) issued in the Chinese Patent Application No. 201580059125.4 dated Nov. 29, 2018.
Chinese Office Action (including an English translation thereof) issued in the Chinese Patent Application No. 201580061118.8 dated Nov. 29, 2018.
Aist, "Transparent Coating Film Excellent in Oil Repellency," URL: http://www.aist.go.jp/aist_j/press_release/pr2012/pr20120313/pr20120313.html, Mar. 13, 2012, 5 pages, with partial English translation.
Chinese Office Action for Chinese Application No. 201580009221.8, dated Apr. 12, 2017, with English translation.
Extended European Search Report for European Application No. 15751325.0, dated Dec. 9, 2016.
Gao et al., "Contact Angle Hysteresis Explained," Langmuir, vol. 22, No. 14, 2006 (published online Jun. 3, 2006), pp. 6234-6237.
International Search Report (Form PCT/ISA/210) for International Application No. PCT/JP2015/054626, dated May 26, 2015.
International Search Report (Form PCT/ISA/210) for International Application No. PCT/JP2015/080176, dated Jan. 19, 2016.
International Search Report (Form PCT/ISA/210), for International Application No. PCT/JP2015/080209, dated Jan. 19, 2016.
International Search Report (Form PCT/ISA/210), for International Application No. PCT/JP2015/080264, dated Jan. 19, 2016.
Japanese Office Action for Japanese Application No. 2014-032316, dated Mar. 13, 2018, with English translation.
Korean Office Action for Korean Application No. 10-2016-7025075, dated Dec. 13, 2017, with English translation.
Park et al., "Long Perfluoroalkyl Chains are not Required for Dynamically Oleophobic Surfaces," Green Chemistry, vol. 15, 2013, pp. 100-104.
U.S. Office Action for U.S. Appl. No. 15/119,437, dated Feb. 6, 2018.
U.S. Office Action for U.S. Appl. No. 15/119,437, dated Jun. 6, 2018.
U.S. Office Action for U.S. Appl. No. 15/522,626, dated Oct. 11, 2018.
U.S. Office Action for U.S. Appl. No. 15/522,584, dated Jun. 15, 2018.
Urata et al., "How to Reduce Resistance to Movement of Alkane Liquid Drops Across Tilted Surfaces Without Relying on Surface Roughening and Perfluorination," Langmuir, vol. 28, Nov. 30, 2012, pp. 17681-17689.
Urata et al., "Smooth, Transparent and Nonperfluorinated Surfaces Exhibiting Unusual Contact Angle Behavior Toward Organic Liquids," RSC Advances, vol. 2, 2012, pp. 9805-9808.
Urata et al., "Unusual Dynamic Dewetting Behavior of Smooth Perfluorinated Hybrid Films: Potential Advantages over Conventional Textured and Liquid-Infused Perfluorinated Surfaces," Langmuir, vol. 29, Sep. 11, 2013, pp. 12472-12482.
Urata et al., "Why Can Organic Liquids Move Easily on Smooth Alkyl-Terminated Surfaces?" Langmuir, vol. 30, Mar. 24, 2014, pp. 4049-4055.
Chinese Office Action and Search Report dated Oct. 31, 2018, for Chinese Application No. 201580060808.1, with English translation of the Office Action.
Taiwanese Office Action and Search Report dated Mar. 5, 2019 for Application No. 104136832, with an English translation.
Taiwanese Office Action and Search Report, dated Apr. 12, 2019, for Taiwanese Patent Application No. 104135378, with an English translation.
Taiwanese Office Action and Search Report, dated Apr. 23, 2019, for Taiwanese Application No. 104135384, with an English translation.
Taiwanese Office Action and Search Report, dated Apr. 8, 2019, for Taiwanese Application No. 104135377, with an English translation.
Taiwanese Office Action and Search Report for Taiwanese Application No. 104136831, dated Jun. 13, 2019, with English translation.
U.S. Office Action for U.S. Appl. No. 15/522,626, dated Jul. 8, 2019.

* cited by examiner

WATER-REPELLANT AND OIL-REPELLANT COATING COMPOSITION AND TRANSPARENT FILM

TECHNICAL FIELD

The present invention relates to a water-repellant and oil-repellant coating composition and a transparent film produced therefrom.

BACKGROUND ART

In the application of a film having repellency to water and oil, e.g., window glass of automobiles and buildings, abrasion resistance of the film is required in addition to water-repellant and oil-repellant functions.

For example, in Patent Document 1 is disclosed a water-repellant and oil-repellant antifouling glass plate on which a film containing a long chain substance having a carbon fluoride group and a hydrocarbon group as major components, a short chain substance having a carbon fluoride group, a hydrocarbon group, and a silyl group as major components, and a substance having a siloxane group as a major component has been formed. Patent Document 2 discloses a water-repellant and water-separate antifouling treating solution comprising a substance 1 having at least a carbon fluoride group as a major component, a substance 2 having a hydrocarbon group as a major component, and a solvent. Moreover, Patent Document 3 discloses a solution for forming a water-repellant and oil-repellant antifouling composite film that is a solution prepared by diluting, with an organic solvent, a first substance containing a carbon fluoride group containing at least an organic fluorine-containing ether group or an organic fluorine-containing polyether group, a hydrocarbon group, and an alkoxysilyl group, a second substance containing a carbon fluoride group, a hydrocarbon group, and an alkoxysilyl group and differing from the first substance, a third substance represented by $(AO)_3Si(OSi(OA)_2)_pOA$, wherein p can be 0 or an integer, A can be an alkyl group, OA can be Cl or NCO, and a silanol condensation catalyst, wherein the molecular length of the second substance is shorter than the molecular length of the first substance.

Patent Documents 1 to 3 disclose examples in which a solution for forming a composite film is prepared by dissolving a long chain substance and a short chain substance, e.g. $CF_3-(CF_2)_7-(CH_2)_2-Si(OCH_3)_3$, in a prescribed solvent, and then a glass plate is dipped in this solution to form a composite film on the glass plate (for example, Example 1 of Patent Document 1, Example 8 of Patent Document 2, Example 1 of Patent Document 3). In these examples, it is disclosed that good abrasion resistance and good water-repellant and oil-repellant characteristics were realized. Patent Document 4 discloses a perfluoropolyether group-containing silane compound having repellency to water and oil.

PRIOR ART DOCUMENTS

Patent Documents

Patent Document 1: JP-A-2008-137858
Patent Document 2: JP-A-2011-174001
Patent Document 3: JP-A-2012-46765
Patent Document 4: JP-A-2014-15609

SUMMARY OF THE INVENTION

Problems to be Solved by the Invention

The object of the present invention is to provide a water-repellant and oil-repellant coating composition which develops good water-repellant and oil-repellant characteristics of waterdrops and from which a film with further improved abrasion resistance, and a transparent film produced therefrom.

Solutions to the Problems

The present inventors have investigated in order to further improve the abrasion resistance of the water-repellant and oil-repellant composite films disclosed in Patent Documents 1 to 3. As a result, the present invention has been accomplished by finding that when a first organic silicon compound (A) in which a fluorine-containing group having a perfluoroalkyl group or a perfluoropolyether group on the free end side thereof and a hydrolyzable group are bonded to a silicon atom thereof is reacted with a second organic silicon compound (B) to place perfluoroalkyl groups or perfluoroether groups of the first organic silicon compound (A) using the second organic silicon compound (B) as a spacer, good water-repellant and oil-repellant characteristics are developed and abrasion resistance is also further improved if a compound having a vapor pressure of 1 atm or less at 100° C. (when having a boiling point, the boiling point is 100° C. or more) is used as the second organic silicon compound (B). The boiling point of $CF_3-(CF_2)_7-(CH_2)_2-Si(OCH_3)_3$ disclosed in examples of Patent Documents 1 to 3 cited above has a boiling point of about 83 to 84° C., and it is deduced that the abrasion resistance was thus deteriorated.

That is to say, a water-repellant and oil-repellant coating composition of the present invention is characterized in comprising;

a first organic silicon compound (A) in which a fluorine-containing group having a perfluoroalkyl group or a perfluoropolyether group on the free end side thereof and a hydrolyzable group are bonded to a silicon atom thereof, and a second organic silicon compound (B) that is a hydrolyzable silane oligomer or a compound in which a carbon fluoride-containing group and a hydrolyzable group are bonded to a silicon atom thereof and that has a vapor pressure at 100° C. of 1 atm or less.

The fluorine-containing group of the first organic silicon compound (A) preferably contains a hydrocarbon group.

The molecular length of the second organic silicon compound (B) is preferably shorter than the molecular length of the first organic silicon compound (A). More specifically, the alkyl group, the longest straight chain part of the fluorine-containing alkyl group, or the carbon fluoride-containing group is preferably shorter in the number of atoms than the longest straight chain part of the fluorine-containing group of the first organic silicon compound (A)

The second organic silicon compound (B) is preferably the compound represented by the following formula (1) or (2)

[Chemical formula 1]

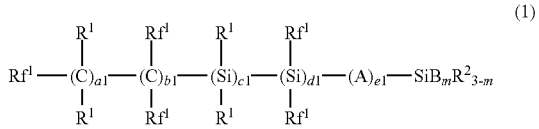
(1)

[Chemical formula 2]

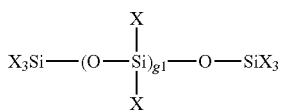
(2)

In the formulae (1) and (2), $Rf^1$ each independently represents a fluorine atom or an alkyl group substituted with one or more fluorine atoms and having 1 to 20 carbon atoms;

$R^1$ each independently represents a hydrogen atom or a lower alkyl group;

$R^2$ each independently represents an alkyl group having 1 to 20 carbon atoms;

A each independently represents —O—, —COO—, —OCO—, —NR—, —NRCO—, or —CONR—, wherein R represents a hydrogen atom, a lower alkyl group, or a lower fluorine-containing alkyl group;

B each independently represents a hydrolyzable group;

X each independently represents a hydrolyzable group, a lower alkyl group, or a lower fluorine-containing alkyl group;

a1, b1, c1, d1, e1, and g1 each independently are an integer of not less than 0 and not more than 100, each of repeating units enclosed in parentheses with a1, b1, c1, d1, or e1 added thereto is present in arbitrary order in the formula, and the sum total of a1, b1, c1, d1, and e1 is 100 or less;

m is an integer of not less than 1 and not more than 3; and at least one X represents a hydrolyzable group.

In addition, the mass ratio of the second organic silicon compound (B) to the first organic silicon compound (A) is preferably 0.1 to 50. The water-repellant and oil-repellant coating composition preferably comprises a solvent (C), and it is especially preferable that the solvent (C) is a fluorine-based solvent.

The present invention comprises a transparent film produced from any one of water-repellant and oil-repellant coating composition mentioned above.

Effects of the Invention

Utilizing the water-repellant and oil-repellant coating composition of the present invention, it is possible to improve the abrasion resistance of a coating film formed therefrom.

MODE FOR CARRYING OUT THE INVENTION

The water-repellant and oil-repellant coating composition of the present invention comprises a first organic silicon compound (A) in which a fluorine-containing group having a perfluoroalkyl group or a perfluoropolyether group on the free end side thereof and a hydrolyzable group are bonded to a silicon atom thereof, and a second organic silicon compound (B) that serves as a spacer of the first organic silicon compound (A). If the organic silicon compounds (A) and (B) are reacted together, then perfluoroalkyl groups or perfluoropolyether groups of the organic silicon compound (A) are arranged with a silicon atom (or a siloxane linkage) of the organic silicon compound (B) sandwiched therebetween, so that water-repellant and oil-repellant characteristics are enhanced. The free end mentioned above means an end of a side where a silicon atom is not bonded to in the fluorine-containing group.

The perfluoroalkyl group has water repellency and oil repellency. Water-repellant and oil-repellant characteristics are improved due to the fact that the perfluoroalkyl group exists on the free end side of the fluorine-containing group. The number of carbon atoms (especially, the number of carbon atoms of the longest straight chain portion) of the perfluoroalkyl group is preferably 3 or more, more preferably 5 or more, and even more preferably 7 or more. The upper limit of the number of carbon atoms is not particularly limited, and good water-repellant and oil-repellant characteristics are exhibited even if the number of carbon atoms is about 20, for example.

The perfluoropolyether group is a group derived from a polyalkylene ether group or a polyalkylene glycol dialkyl ether residue by replacing all hydrogen atoms thereof with fluorine atoms, and it can also be called a perfluoropolyalkylene ether group or a perfluoropolyalkylene glycol dialkyl ether residue. The perfluoropolyether group also has water repellency and oil repellency. The number of the carbon atoms contained in the longest straight chain portion of the perfluoropolyether group is preferably 5 or more, more preferably 10 or more, and even more preferably 20 or more. The upper limit of the number of the carbon atoms is not particularly limited, and the number of the carbon atoms may be about 200, for example.

The fluorine-containing group should just have the above-mentioned perfluoroalkyl group or perfluoropolyether group on the free end side thereof. Therefore, there may be an appropriate linking group on the side where the fluorine-containing group is bonded to a silicon atom, or alternatively the above-mentioned perfluoroalkyl group or perfluoroalkyl group may be bonded directly to a silicon atom without the linking group. Examples of the linking group include hydrocarbon groups such as alkylene groups, aromatic hydrocarbon groups, (poly)alkylene glycol groups, groups derived from the foregoing by replacing some of the hydrogen atoms thereof with F, and groups in which the foregoing are linked appropriately. The number of the carbon atom of the linking group is, for example, not less than 1 and not more than 20, and is preferably not less than 2 and not more than 10.

Two or more silicon atoms may be bonded to one linking group, and two or more perfluoroalkyl groups or perfluoropolyether groups may be bonded to one linking group.

Although the number of the fluorine-containing groups bonded to a silicon atom should just be 1 or more and may be 2 or 3, it is preferably 1 or 2, and particularly preferably is 1.

The hydrolyzable group has an operation of bonding (1) organic silicon compounds (A) to each other, or (2) organic silicon compound (A) to an active hydrogen (e.g., a hydroxyl group) located on a surface of a substrate, or (3) organic silicon compounds (A) and (B) to each other. Examples of such a hydrolyzable group include an alkoxy group (especially, an alkoxy group having 1 to 4 carbon atoms), a hydroxy group, an acetoxy group, an allyl group, and a halogen atom (especially, a chlorine atom). Preferable hydrolyzable groups are alkoxy groups, allyl groups, and halogen atoms, and especially, a methoxy group, an ethoxy group, an allyl group, and a chlorine atom are preferred.

Although the number of the hydrolyzable groups bonded to a silicon atom should just be 1 or more and may be 2 or 3, it is preferably 2 or 3, and particularly preferably is 3. When two or more hydrolyzable groups are bonded to a silicon atom, different hydrolyzable groups may be bonded to the silicon atom, and the same hydrolyzable groups are preferably bonded to the silicon atom.

Although the total number of the fluorine-containing groups and the hydrolyzable groups which are bonded to a silicon atom is usually 4, it may be 2 or 3 (especially, 3). When the total number is 3 or less, an alkyl group (especially, an alkyl group having 1 to 4 carbon atoms), H, NCO, or the like can be bonded to the remaining bond or bonds.

The fluorine-containing group of the first organic silicon compound (A) may be in a straight chain form or alternatively may have a side chain.

Examples of the first organic silicon compound (A) include a compound of the following formula (3).

[Chemical formula 3]

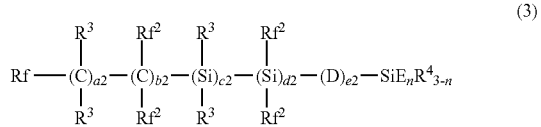

In the formula (3), Rf represents a fluorine atom or an alkyl group which has 1 to 20 carbon atoms and is substituted with one or more fluorine atoms. Rf is preferably an alkyl group which has 1 to 10 carbon atoms and is substituted with one or more fluorine atoms, more preferably is a perfluoroalkyl group having 1 to 10 carbon atoms, and even more preferably is a perfluoroalkyl group having 1 to 5 carbon atoms.

$Rf^2$ each independently represents a fluorine atom or an alkyl group which has 1 to 20 carbon atoms and is substituted with one or more fluorine atoms. Preferably, $Rf^2$ each independently represents a fluorine atom or a fluorine-containing alkyl group having 1 to 2 carbon atoms, and more preferably, all $Rf^2$ are fluorine atoms. $R^3$ each independently represents a hydrogen atom or a lower alkyl group. Preferably, $R^3$ is each independently a hydrogen atom or an alkyl group having one or two carbon atoms, and more preferably, all $R^3$ are hydrogen atoms.

$R^4$ each independently represents an alkyl group having 1 to 20 carbon atoms. Preferably, $R^4$ is an alkyl group having 1 to 5 carbon atoms.

D each independently represents —O—, —COO—, —OCO—, —NR—, —NRCO—, or —CONR—, wherein R represents a hydrogen atom, a lower alkyl group, or a lower fluorine-containing alkyl group. Preferably, D each independently is —COO—, —O—, or —OCO—, and more preferably, all D are —O—.

E each independently represents a hydrolyzable group. Preferred as E are an alkoxy group having 1 to 4 carbon atoms, an allyl group, and a halogen atom, and particularly preferred are a methoxy group, an ethoxy group, an allyl group, and a chlorine atom.

a2, b2, c2, d2, and e2 are each independently an integer of not less than 0 and not more than 600, and the sum total of a2, b2, c2, d2, and e2 is 13 or more. Preferably, a2, c2, and d2 are each independently equal to or smaller than ½ of b2, and more preferably equal to or smaller than ¼ of b2, and even more preferably, c2 or d2 is 0, and particularly preferably, c2 and d2 are 0.

e2 is preferably equal to or more than ⅕ of the sum total of a2, b2, c2, and d2 and equal to or less than the sum total of a2, b2, c2, and d2.

b2 is preferably not less than 20 and not more than 600, more preferably not less than 20 and not more than 200, and even more preferably not less than 50 and not more than 200.

e2 is preferably not less than 4 and not more than 600, more preferably not less than 4 and not more than 200, and even more preferably not less than 10 and not more than 200.

The sum total of a2, b2, c2, d2, and e2 is preferably not less than 20 and not more than 600, more preferably not less than 20 and not more than 200, and even more preferably not less than 50 and not more than 200.

Although each of repeating units enclosed in parentheses with a2, b2, c2, d2, or e2 added thereto is present in arbitrary order in the formula, it is preferred that the repeating unit which is enclosed in parentheses with b2 and located closest to the fixed end (on the side where the fluorine-containing group is bonded to a silicon atom) is located closer to the free end than the repeating unit which is enclosed in parentheses with a2 and located closest to the free end, and it is more preferred that the repeating unit which is enclosed in parentheses with b2 or d2 and located closest to the fixed end is located closer to the free end than the repeating unit which is enclosed in parentheses with a2 or c2 and located closest to the free end.

n is an integer of not less than 1 and not more than 3. n is preferably not less than 2 and not more than 3, and more preferably 3.

Examples of the first organic silicon compound (A) include a compound of the formula (4).

[Chemical formula 4]

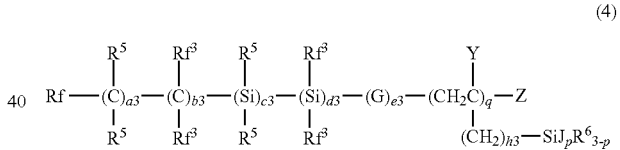

In the formula (4), Rf represents a fluorine atom or an alkyl group which has 1 to 20 carbon atoms and is substituted with one or more fluorine atoms. Rf is preferably an alkyl group which has 1 to 10 carbon atoms and substituted with one or more fluorine atoms, more preferably is a perfluoroalkyl group having 1 to 10 carbon atoms, and even more preferably is a perfluoroalkyl group having 1 to 5 carbon atoms.

$Rf^3$ each independently represents a fluorine atom or an alkyl group which has 1 to 20 carbon atoms and is substituted with one or more fluorine atoms. Preferably, $Rf^3$ each independently represents a fluorine atom or a fluorine-containing alkyl group having 1 to 2 carbon atoms, and more preferably, all $Rf^3$ are fluorine atoms.

$R^5$ each independently represents a hydrogen atom or a lower alkyl group. Preferably, $R^5$ is each independently a hydrogen atom or an alkyl group having one or two carbon atoms, and more preferably, all $R^5$ are hydrogen atoms.

$R^6$ each independently represents an alkyl group having 1 to 20 carbon atoms. Preferably, $R^6$ is an alkyl group having 1 to 5 carbon atoms.

G each independently represents —O—, —COO—, —OCO—, —NR—, —NRCO—, or —CONR—, wherein R represents a hydrogen atom, a lower alkyl group, or a lower fluorine-containing alkyl group. Preferably, G each independently is —COO—, —O—, or —OCO—, and more preferably, all G are —O—.

J each independently represents a hydrolyzable group. Preferred as J are an alkoxy group, an allyl group, and a halogen atom, and particularly preferred are a methoxy group, an ethoxy group, an allyl group, and a chlorine atom.

Y each independently represents a hydrogen atom or a lower alkyl group. Preferably Y is each independently a hydrogen atom or an alkyl group having one or two carbon atoms, and more preferably, all Y are hydrogen atoms.

Z each independently represents a hydrogen atom or a halogen atom. Preferably, Z is a hydrogen atom.

a3, b3, c3, d3, and e3 are each independently an integer of not less than 0 and not more than 600, and the sum total of a3, b3, c3, d3, and e3 is 13 or more. Preferably, a3, c3, and d3 are each independently not more than ½ of b3, more preferably not more than ¼ of b3, and more preferably, c3 or d3 is 0, and particularly preferably, c3 and d3 are 0.

e3 is preferably not less than ⅕ of the sum total of a3, b3, c3, and d3 and equal to or less than the sum total of a3, b3, c3, and d3.

b3 is preferably not less than 20 and not more than 600, more preferably not less than 20 and not more than 200, and even more preferably not less than 50 and not more than 200. e3 is preferably not less than 4 and not more than 600, more preferably not less than 4 and not more than 200, and even more preferably not less than 10 and not more than 200. The sum total of a3, b3, c3, d3, and e3 is preferably not less than 20 and not more than 600, preferably not less than 20 and not more than 200, and more preferably not less than 50 and not more than 200.

h3 is an integer of not less than 0 and not more than 2, preferably not less than 0 and not more than 1, and q is an integer of not less than 1 and not more than 10, preferably not less than 1 and not more than 8.

Although each of repeating units enclosed in parentheses with a3, b3, c3, d3, or e3 added thereto is present in arbitrary order in the formula, it is preferred that the repeating unit which is enclosed in parentheses with b3 and located closest to the fixed end (on the side where the fluorine-containing group is bonded to a silicon atom) is located closer to the free end than the repeating unit which is enclosed in parentheses with a3 and located closest to the free end, and it is more preferred that the repeating unit which is enclosed in parentheses with b3 or d3 and located closest to the fixed end is located closer to the free end than the repeating unit which is enclosed in parentheses with a3 or c3 and located closest to the free end.

p is an integer of not less than 1 and not more than 3, preferably not less than 2 and not more than 3, and more preferably 3.

In the formulae (3) and (4), "lower" means that the number of carbon atom(s) is 1 to 4.

In the present invention, a compound having a vapor pressure of 1 atm or less at a temperature of 100° C. is used as the second organic silicon compound (B) to be used as a spacer of the first organic silicon compound (A). If such a compound having the vapor pressure is used as a spacer, the abrasion resistance of a resulting film is improved. Although the above-mentioned compound need not have a boiling point, if it has a boiling point, the compound having a boiling point of 100° C. or more corresponds the above-mentioned compound. Regarding a preferable compound, the temperature at which the vapor pressure of the compound reaches 1 atm or more is 110° C. or more, preferably 120° C. or more, and more preferably 130° C. or more. The upper limit of the temperature at which the vapor pressure reaches 1 atm or more is not particularly limited, and a compound that starts to decompose before the vapor pressure thereof reaches 1 atm or more can be used.

The second organic silicon compound (B) needs to condense with the first organic silicon compound (A) or an active hydrogen of a hydroxy group and the like located on the surface of a substrate. For this reason, there can be used as the second organic silicon compound a compound in which a carbon fluoride-containing group and a hydrolyzable group are bonded to a silicon atom or a hydrolyzable silane oligomer. Such a compound can improve the water-repellant and oil-repellant characteristics exerted by a fluorine-containing group of the above-mentioned compound (A) by serving as a spacer of the compound (A).

Preferably, the molecular length of the second organic silicon compound (B) is shorter than that of the first organic silicon compound (A). By making the molecular length of the compound (B) short, it becomes easy to expose the fluorine-containing group of the compound (A) to the surface of a film surface and the water-repellant and oil-repellant characteristics are further improved. The molecular length of the second organic silicon compound (B) is preferably ½ or less, more preferably ⅕ or less, and even more preferably ¹⁄₁₀ or less of the molecular length of the first organic silicon compound (A).

In comparing the molecular length of the compound (B) and that of the compound (A), specifically, it is preferred that the longest straight chain part of the alkyl group, the fluorine-containing alkyl group, or the carbon fluoride-containing group of the second organic silicon compound (B) is shorter in the number of atoms than the longest straight chain part of the fluorine-containing group of the first organic silicon compound (A).

In order to improve the compatibility with the first organic silicon compound (A), the second organic silicon compound (B) preferably contains a fluorine atom, and a compound represented by the above formula (1) is more preferred from simplicity in its synthesis.

When the second organic silicon compound (B) contains a carbon fluoride-containing group, the carbon fluoride-containing group is preferably a group having a fluoroalkyl group at its end, and particularly preferably is a group having a trifluoromethyl group at its end. Examples of the group having a fluoroalkyl group at its end include fluoroalkyl groups, fluoroalkoxyalkylene groups, fluoroalkylsilylalkylene groups, fluoroalkylcarbonyloxyalkylene groups, fluoroalkylarylene groups, fluoroalkylalkenylene groups, and fluoroalkylalkynylene groups.

Examples of the fluoroalkyl groups include fluoroalkyl groups having 1 to 12 carbon atoms such as a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, and a fluorododecyl group.

Examples of the fluoroalkoxyalkylene groups include fluoromethoxy($C_{5-20}$ alkylene) groups, fluoroethoxy($C_{5-20}$ alkylene) groups, fluoropropoxy($C_{5-20}$ alkylene) groups, and fluorobutoxy($C_{5-20}$ alkylene) groups.

Examples of the fluoroalkylsilylalkylene groups include fluoromethylsilyl($C_{5-20}$ alkylene) groups, fluoroethylsilyl($C_{5-20}$ alkylene) groups, fluoropropylsilyl($C_{5-20}$ alkylene) groups, fluorobutylsilyl($C_{5-20}$ alkylene) groups, fluoropentylsilyl($C_{5-20}$ alkylene) groups, fluorohexylsilyl($C_{5-20}$ alkylene) groups, fluoroheptylsilyl($C_{5-20}$ alkylene) groups, and fluorooctylsilyl($C_{5-20}$ alkylene) groups.

Examples of the fluoroalkylcarbonyloxyalkylene groups include fluoromethylcarbonyloxy($C_{5-20}$ alkylene) groups, fluoroethylcarbonyloxy($C_{5-20}$ alkylene) groups, fluoropropylcarbonyloxy($C_{5-20}$ alkylene) groups, and fluorobutylcarbonyloxy($C_{5-20}$ alkylene) groups.

Examples of the fluoroalkylarylene groups include fluoro($C_{1-8}$ alkyl)phenylene groups and fluoro($C_{1-8}$ alkyl)naphthylene groups; examples of the fluoroalkylalkenylene groups include fluoro($C_{1-17}$ alkyl)vinylene groups; and examples of the fluoroalkylalkynylene groups include fluoro($C_{1-17}$ alkyl)ethynylene groups.

Examples of the hydrolyzable group of the second organic silicon compound (B) include those listed above for the hydrolyzable group of the compound (A), and preferable hydrolyzable groups are an alkoxy group, an allyl group, and a halogen atom, and especially, a methoxy group, an ethoxy group, an allyl group, a chlorine atom are preferable. When there are a plurality of hydrolyzable groups, they can be the same or different, but preferably, they are the same.

The total number of the carbon fluoride-containing group (s) and the hydrolyzable group(s) which are bonded to a silicon atom is usually 4 and may be 2 or 3 (especially, 3). When the total number is 3 or less, an alkyl group (especially, an alkyl group having 1 to 4 carbon atoms), H, a cyano group, or the like can be bonded to the remaining bond or bonds. In particular, it is preferred that the total number of the carbon fluoride-containing group(s) and the hydrolyzable group(s) is 4; in this case, any of that the number of the carbon fluoride-containing group(s) is 3 and the number of the hydrolyzable group(s) is 1, that both the number of the carbon fluoride-containing group(s) and the number of the hydrolyzable group(s) are 2, and that the number of the carbon fluoride-containing group(s) is 1 and the number of the hydrolyzable group(s) is 3 is permissible, and it is preferred that the number of the carbon fluoride-containing group(s) is 1 and the number of the hydrolyzable group(s) is 3.

The combination of the carbon fluoride-containing group and the hydrolyzable group is not particularly limited, and any combination including or not including the formula (1) given below is available, and preferred combinations include a combination of a fluoroalkyl group and an alkoxy group (e.g., fluoroalkylalkoxysilanes and the like; especially, fluoroalkyltrialkoxysilanes and the like.), a combination of a fluoroalkyl group and an allyl group (e.g., fluoroalkylallylsilanes and the like; especially, fluoroalkyltriallylsilanes and the like), and a combination of a fluoroalkyl group and a halogen atom (e.g., fluoroalkylhalosilanes and the like; especially, fluoroalkyltrihalosilanes and the like).

Of the aforementioned second organic silicon compounds, the hydrolyzable silane oligomer means an oligomer that is generated from a silane compound having two or more hydrolyzable groups, preferably a silane compound having two or more (especially 3) hydrolyzable groups and a fluorine-containing group (especially, a lower fluorine-containing alkyl group) by hydrolysis condensation. The number of the silicon atoms contained in the oligomer (the number of condensation) is 3 or more, for example, and preferably 5 or more, more preferably 7 or more. The number of condensation is preferably 15 or less, more preferably 13 or less, and even more preferably 10 or less.

Examples of the hydrolyzable group which the oligomer has include alkoxy groups such as a methoxy group, an ethoxy group, a propoxy group, and a butoxy group, an allyl group, and preferred are a methoxy group, an ethoxy group, an allyl group, and the like. The oligomer can have such hydrolyzable groups of one type or alternatively of two or more types, and preferably has one type of hydrolyzable groups.

Preferably, the second organic silicon compound (B) can be represented by the following formula (1) or (2). The formula (1) is a preferable example of compounds in which a carbon fluoride-containing group and a hydrolyzable group are bonded to a silicon atom, and the formula (2) is a preferable example of hydrolyzable silane oligomers.

[Chemical formula 5]

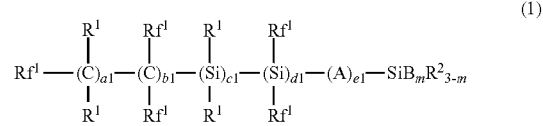

In the formula (1), $Rf^1$ each independently represents a fluorine atom or an alkyl group which has 1 to 20 carbon atoms and is substituted with one or more fluorine atoms;

$R^1$ each independently represents a hydrogen atom or a lower alkyl group;

$R^2$ each independently represents an alkyl group having 1 to 20 carbon atoms;

A each independently represents —O—, —COO—, —OCO—, —NR—, —NRCO—, or —CONR—, wherein R represents a hydrogen atom, a lower alkyl group, or a lower fluorine-containing alkyl group;

B each independently represents a hydrolyzable group;

a1, b1, c1, d1, and e1 each independently are an integer of not less than 0 and not more than 100, each of repeating units enclosed in parentheses with a1, b1, c1, d1, or e1 added thereto is present in arbitrary order in the formula, the sum total of a1, b1, c1, d1, and e1 is 100 or less; and m is an integer of not less than 1 and not more than 3.

In the formula (1), "lower" means that the number of carbon atom(s) is 1 to 4.

$Rf^1$ preferably is a fluorine atom or a perfluoroalkyl having 1 to 10 carbon atoms (more preferably 1 to 5 carbon atoms). $R^1$ is preferably a hydrogen atom or an alkyl having 1 to 4 carbon atoms. $R^2$ is preferably an alkyl group having 1 to 5 carbon atoms. A is preferably —O—, —COO—, or —OCO—. B is preferably an alkoxy group having 1 to 4 carbon atoms, an allyl group, or a halogen atom, more preferably an alkoxy group having 1 to 4 carbon atoms, an allyl group, or a chlorine atom, even more preferably an alkoxy group having 1 to 4 carbon atoms, particularly preferably a methoxy group or an ethoxy group, and most preferably an ethoxy group. In addition, a1 is preferably 1 to 30, more preferably 1 to 25, even more preferably 1 to 10, particularly preferably 1 to 5, and most preferably 1 to 2. b1 is preferably 0 to 15, more preferably 0 to 10. c1 is preferably 0 to 5, more preferably 0 to 2. d1 is preferably 0 to 4, more preferably 0 to 2. e1 is preferably 0 to 4, more preferably 0 to 2. m is preferably 2 to 3, more preferably 3. The sum total of a1, b1, c1, d1, and e1 is preferably 3 or more, more preferably 5 or more, and is preferably 80 or less, more preferably 50 or less, even more preferably 20 or less.

In particular, it is preferred that $Rf^1$ is a fluorine atom or a perfluoroalkyl having 1 to 5 carbon atoms, $R^1$ is a hydrogen atom, B is a methoxy group or an ethoxy group, c1, d1, and e1 are each 0, m is 3, a1 is 1 to 5, and b1 is 0 to 5.

In the second organic silicon compound (B), a compound in which a carbon fluoride-containing group and a hydrolyzable group are bonded to a silicon atom includes, for example, $CF_3$—Si—$(OCH_3)_3$ and $C_jF_{2j+1}$—Si—$(OC_2H_5)_3$ (j is an integer of 1 to 12), and especially preferred are $C_4F_9$—Si—$(OC_2H_5)_3$, $C_6F_{13}$—Si—$(OC_2H_5)_3$, $C_7F_{15}$—Si—$(OC_2H_5)_3$, and $C_8F_{17}$—Si—$(OC_2H_5)_3$. There can be included $CF_3CH_2O(CH_2)_kSiCl_3$, $CF_3CH_2O(CH_2)_kSi(OCH_3)_3$, $CF_3CH_2O(CH_2)_kSi(OC_2H_5)_3$, $CF_3(CH_2)_2Si(CH_3)_2(CH_2)_kSiCl_3$, $CF_3(CH_2)_2Si(CH_3)_2(CH_2)_kSi(OCH_3)_3$, $CF_3(CH_2)_2Si(CH_3)_2(CH_2)_kSi(OC_2H_5)_3$, $CF_3(CH_2)_6Si(CH_3)_2(CH_2)_kSiCl_3$, $CF_3(CH_2)_6Si(CH_3)_2(CH_2)_kSi(OCH_3)_3$, $CF_3(CH_2)_6Si(CH_3)_2(CH_2)_kSi(OC_2H_5)_3$, $CF_3COO(CH_2)_kSiCl_3$, $CF_3COO(CH_2)_kSi(OCH_3)_3$, $CF_3COO(CH_2)_kSi(OC_2H_5)_3$ (all of k are 5 to 20, preferably 8 to 15). There can be included $CF_3(CF_2)_m$—$(CH_2)_n SiCl_3$, $CF_3(CF_2)_m$—$(CH_2)_n Si(OCH_3)_3$, and $CF_3(CF_2)_m$—$(CH_2)_n Si(OC_2H_5)_3$ (all of m are 1 to 10, preferably 3 to 7, all of n are 1 to 5, preferably 2 to 4). $CF_3(CF_2)_p$—$(CH_2)_q$—Si—$(CH_2CH=CH_2)_3$ are also included (all of p are 2 to 10, preferably 2 to 8, all of q are 1 to 5, preferably 2 to 4). There can be included $CF_3(CF_2)_p$—$(CH_2)_q SiCH_3Cl_2$, $CF_3(CF_2)_p$—$(CH_2)_q SiCH_3(OCH_3)_2$, and $CF_3(CF_2)_p$—$(CH_2)_q SiCH_3(OC_2H_5)_2$ (all of p are 2 to 10, preferably 3 to 7, all of q are 1 to 5, preferably 2 to 4).

The following formula (2) is a preferable example in the case that the second organic silicon compound (B) is a hydrolyzable silane oligomer.

[Chemical formula 6]

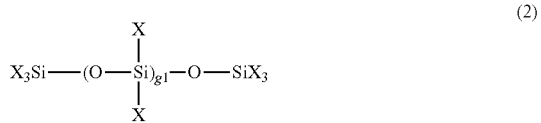

(2)

In the above formula (2),

X each independently represents a hydrolyzable group, a lower alkyl group, or a lower fluorine-containing alkyl group, and g1 is an integer of not less than 0 and not more than 100.

In the formula (2), "lower" means that the number of carbon atom(s) is 1 to 4.

Examples of the hydrolyzable group include alkoxy groups such as a methoxy group, an ethoxy group, a propoxy group, and a butoxy group, and an allyl group. At least one of X preferably contains a hydrolyzable group (especially, an ethoxy group, a methoxy group, or an allyl group), more preferably an alkoxy group, and particularly preferably an ethoxy group. g1 is preferably not less than 0 and not more than 10, and more preferably not less than 0 and not more than 7. It is also preferred that at least one of X is a lower fluorine-containing alkyl group.

As the hydrolyzable silane oligomer, for example, there can be included $(H_5C_2O)_3$—Si—$(OSi(OC_2H_5)_2)_4OC_2H_5$, $(H_3CO)_2Si(CH_2CH_2CF_3)$—$(OSiOCH_3(CH_2CH_2CF_3))_4$—$OCH_3$.

It is preferred to use the first organic silicon compound (A) and the second organic silicon compound (B) in an appropriate mass ratio, and it is preferred that the mass ratio of the second organic silicon compound (B) to the first organic silicon compound (A) (namely, the second organic silicon compound (B)/the first organic silicon compound (A)) is 0.1 to 50. The mass ratio is preferably 0.2 to 40, and more preferably 0.5 to 30.

Preferably, the water-repellant and oil-repellant coating composition of the present invention further contains a solvent (C). Preferred as the solvent (C) is a fluorine-based solvent. Specific examples of the fluorine-based solvent include chlorofluorocarbons, hydrofluoroethers such as Novec (manufactured by 3M Company), perfluorocarbons such as Fluorinert (manufactured by 3M Company), hydrochlorofluorocarbons such as ASAHIKLIN AK225 (manufactured by ASAHI GLASS CO., LTD.), and hydrofluorocarbons such as ASAHIKLIN AC2000 (manufactured by ASAHI GLASS CO., LTD.). When using a carbon fluoride-based organic solvent containing chlorine, an organic chlorine-based solvent such as chloroform may further be added.

When the solvent (C) is contained, the total amount of the first organic silicon compound (A) and the second organic silicon compound (B) relative to the total amount of the first organic silicon compound (A), the second organic silicon compound (B), and the solvent (C) can be chosen within an appropriate range depending on the method for forming a film. For example, when coating is carried out by a wet method, the total amount of the first organic silicon compound (A) and the second organic silicon compound (B) is preferably 0.001 to 20% by mass, more preferably 0.01 to 5.0% by mass, and even more preferably 0.01 to 0.2% by mass. If the concentration is made higher than that, excess compounds bleed out of a coating film and the coating film gets cloudy, leading to remarkable deterioration in abrasion resistance.

The water-repellant and oil-repellant coating composition may further contain a silanol condensation catalyst. Examples of the silanol condensation catalyst include inorganic acids such as hydrochloric acid and nitric acid, organic acids such as acetic acid, metal complexes such as titanium complexes (e.g. ORGATIX TC-750 produced by Matsumoto Fine Chemical Co., Ltd.) and tin complexes, and metal alkoxides. The amount of the silanol condensation catalyst is 0.00001 to 0.1% by mass, preferably 0.00002 to 0.01% by mass, and more preferably 0.0005 to 0.001% by mass, for example, relative to the total amount of the first organic silicon compound (A), the second organic silicon compound (B), and the solvent (C).

The water-repellant and oil-repellant coating composition may contain various types of additives such as an antioxidant, a rust inhibitor, an ultraviolet absorber, a light stabilizer, an antifungal agent, an antibacterial agent, an organism adhesion inhibitor, a deodorant, a pigment, a flame retardant, and an antistatic agent as long as the effect of the present invention is not impaired.

Examples of the antioxidant include phenol-based antioxidants, sulfur-based antioxidants, phosphorus-based antioxidants, and hindered amine-based antioxidants shown below.

Examples of a phenol-based antioxidant include n-octadecyl-3-(4-hydroxy-3,5-di-t-butylphenyl) propionate, 2,6-di-t-butyl-4-methylphenol, 2,2-thio-diethylene-bis-[3-(3,5-di-t-butyl-4-hydroxyphenyl) propionate], tri-ethylene glycol bis-[3-(3-t-butyl-5-methyl-4-hydroxyphenyl) propionate], 3,9-bis[2-{3-(3-t-butyl-4-hydroxy-5-methylphenyl)propionyloxy}-1,1-dimethyl ethyl]-2,4,8,10-tetraoxaspiro[5.5]undecane, pentaerythrityl tetrakis{3-(3,5-di-t-butyl-4-hydroxyphenyl)propionate}, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl) benzene, tris(3,5-di-t-butyl-4-hydroxybenzyl) isocyanurate, 1,3,5-tris(4-t-butyl-3-hydroxy-2,6-dimethylbenzyl)-1,3,5-triazine-2,4,6(1H,3H,5H)-trione, 2,2'-methylenebis(6-t-butyl-4-methylphenol), 4,4'-butylidenebis(6-t-butyl-3-methylphenol), and 4,4'-thiobis(6-t-butyl-3-methylphenol).

Examples of a sulfur-based antioxidant include 3,3'-thiodi-propanoicacidididodecylester3,3'-thio-di-propanoicacid-itetradecylester, 3,3'-thio-di-propanoicacidioctadecylester, and pentaerythrityltetrakis(3-dodecylthiopropionate).

Examples of a phosphorus-based antioxidant include tris (2,4-di-t-butylphenyl) phosphite, bis(2,4-di-t-butylphenyl) pentaerythritol diphosphite, bis(2,6-di-t-butyl-4-methylphenyl)pentaerythritol diphosphite, bis(2,4-di-cumylphenyl) pentaerythritol diphosphite, tetrakis(2,4-di-t-butylphenyl)-4,4'-biphenylene diphosphonite, and bis[2,4-di-t-butyl,(6-methyl)phenyl]ethyl phosphite.

Examples of a hindered amine-based antioxidant include bis(2,2,6,6-tetramethyl-4-piperidyl) sebacate (melting point: 81 to 86° C.), 2,2,6,6-tetramethyl-4-piperidyl methacrylate (melting point: 58° C.), poly[{6-(1,1,3,3-tetrametylbutyl) amino-1,3,5-triazine-2,4-diyl}[(2,2,6,6-tetramethyl-4-piperidyl)imino}-1,6-hexamethylene{(2,2,6,6-tetramethyl-4-piperidyl)imino}].

Examples of the rust inhibitor include alkanol amines, quaternary ammonium salts, alkanethiols, imidazoline, sodium metavanadate, bismuth citrate, phenol derivatives, polyalkenylamines, alkylimidazoline derivatives, cyanoalkylamines, carboxylic amides, alkylenediamines, pyrimidine, carboxylic acid composites, naphthenic acid composites, and sulfonic acid composites thereof, calcium nitrite, alkylamines and esters, polyalcohol, polyphenol, alkanol amines, sodium molybdate, sodium tungstate, sodium nitrite, sodium phosphonate, sodium chromate, sodium silicate, gelatin, polymers of carboxylic acids, aliphatic and aromatic amines and diamines, ethoxylated amines, imidazole, benzimidazole, nitro compounds, formaldehyde, acetylene alcohol, aliphatic and aromatic thiols, sulfides, and sulfoxides, thiourea, acetylene alcohol, 2-mercaptobenzimidazole, amine or quaternary ammonium salt+halogen ion, acetylene thiol and sulfide, dibenzyl sulfoxide, alkylamine+ potassium iodide, dicyclohexylamine nitrite, cyclohexylamine benzoate, benzotriazole, tannin+sodium phosphate, triethanolamine+lauryl sarcosine+benzotriazole, and alkylamine+benzotriazole+sodium nitrite+sodium phosphate.

Examples of the ultraviolet absorber and light stabilizer include 2-(5-methyl-2-hydroxyphenyl)benzotriazole, 2-[2-hydroxy-3,5-bis(α,α-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl) benzotriazole, a condensate with methyl 3-[3-t-butyl-5-(2H-benzotriazol-2-yl)-4-hydroxyphenyl]propionate-polyethylene glycol (molecular weight: about 300), hydroxyphenylbenzotriazole derivatives, 2-(4,6-diphenyl-1,3,5-triazin-2-yl)-5-[(hexyl)oxy]-phenol, and 2-ethoxy-2'-ethyloxalic acid bisanilide.

Examples of the antifungal agent and antibacterial agent include 2-(4-thiazolyl)benzimidazole, sorbic acid, 1,2-benzisothiazolin-3-one, sodium (2-pyridylthio-1-oxide), dehydroacetic acid, 2-methyl-5-chloro-4-isothiazolone complex, 2,4,5,6-tetra-chlorophthalonitrile, methyl 2-benzimidazolecarbamate, methyl 1-(butylcarbamoyl)-2-benzimidazolecarbamate, mono- or dibromocyanoacetamides, 1,2-dibromo-2,4-dicyanobutane, 1,1-dibromo-1-nitropropanol, and 1,1-dibromo-1-nitro-2-acetoxypropane.

Examples of the organisms adhesion inhibitor include tetramethylthiuram disulfide, zinc bis(N,N-dimethyldithiocarbamate), 3-(3,4-dichlorophenyl)-1,1-dimethylurea, dichloro-N-((dimethylamino)sulfonyl)fluoro-N-(P-tolyl) methanesulfenamide, pyridine-triphenylborane, N,N-dimethyl-N'-phenyl-N'-(fluorodichloromethylthio)sulfamide, copper(I) thiocyanate, copper(I) oxide, tetrabutylthiuram disulfide, 2,4,5,6-tetrachloroisophthalonitrile, zinc ethylenebisdithiocarbamate, 2,3,5,6-tetra-chloro-4-(methylsulfonyl)pyridine, N-(2,4,6-trichlorophenyl)maleimide, zinc bis (2-pyridinethiol-1-oxide), copper bis(2-pyridinethiol-1-oxide), 2-methylthio-4-t-butylamino-6-cyclopropylamino-s-triazine, 4,5-dichloro-2-n-octyl-4-isothiazolin-3-one, furanones, alkylpyridine compounds, gramin-based compounds, and isonitrile compounds.

Examples of the deodorant include organic acids such as lactic acid, succinic acid, malic acid, citric acid, maleic acid, malonic acid, ethylenediamine polyacetic acid, alkane-1,2-dicarboxylic acid, alkene-1,2-dicarboxylic acid, cycloalkane-1,2-dicarboxylic acid, cycloalkene-1,2-dicarboxylic acid, and naphthalenesulfonic acid; metal salts of fatty acids such as zinc undecenoate, zinc 2-ethylhexanoate, and zinc ricinoleate; metal compounds such as iron oxide, ferrous sulfate, zinc oxide, zinc sulfate, zinc chloride, silver oxide, copper oxide, sodium metal (iron, copper, and the like)-chlorophyllin, metal (iron, copper, cobalt, and the like) phthalocyanine, metal (iron, copper, cobalt, and the like) tetrasulfonic acid phthalocyanine, titanium dioxide, and visible light response type titanium dioxide (nitrogen dope type and the like); cyclodextrins such as α-, β-, or γ-cyclodextrin, and their methyl derivatives, hydroxypropyl derivatives, glucosyl derivatives, and maltosyl derivatives; acrylic acid-based polymers such as porous methacrylic acid polymer and porous acrylic acid polymer; aromatic polymers such as porous divinylbenzene polymer, porous styrene-divinylbenzene-vinylpyridine polymer, porous divinylbenzene-vinylpyridine polymer, and copolymers thereof, and porous materials such as chitin, chitosan, activated carbon, silica gel, activated alumina, zeolite, ceramics.

Examples of the pigment include carbon black, titanium oxide, phthalocyanine-based pigments, quinacridone-based pigments, isoindolinone-based pigments, perylene or perynone-based pigments, quinophthalone-based pigments, diketopyrrolo-pyrrole-based pigments, dioxazine-based pigments, disazo condensed-based pigments, and benzimidazolone-based pigments.

Examples of the flame retardant include decabromobiphenyl, antimony trioxide, phosphorus-based flame retardants, and aluminum hydroxide.

Examples of the antistatic agent include quaternary ammonium-salt type cationic surfactants, betaine type ampholytic surfactants, alkyl phosphate type anionic surfactants, cationic surfactants such as primary amine salts, secondary amine salts, tertiary amine salts, quaternary amine salts, and pyridine derivatives, anionic surfactants such as sulfated oils, soap, sulfated ester oils, sulfated amide oils, sulfated olefin ester salts, sulfated aliphatic alcohol ester salts, sulfated alkyl ester salts, fatty acid ethyl sulfonate salts, alkylnaphthalenesulfonate salts, alkylbenzenesulfonate salts, succinate ester sulfonate salts, phosphate ester salts, nonionic surfactants such as partial fatty acid esters of polyhydric alcohols, ethylene oxide adducts of aliphatic alcohols, ethylene oxide adducts of fatty acids, ethylene oxide adducts of aliphatic amines or aliphatic amides, ethylene oxide adducts of alkylphenols, ethylene oxide adducts of partial fatty acid esters of polyhydric alcohols, and polyethylene glycol, ampholytic surfactants such as carboxylic acid derivatives and imidazoline derivatives.

In the water-repellant and oil-repellant coating composition of the present invention can also be contained a lubricant, a filler, a plasticizer, a nucleating agent, an antiblocking agent, a foaming agent, an emulsifier, a brightening agent, a binder, or the like.

When the water-repellant and oil-repellant coating composition of the present invention contains an additive, the content of the additive is, for example, not less than 0.01% by weight and not more than 70% by weight, preferably not less than 0.1% by weight and not more than 50% by weight, more preferably 0.5% by weight to 30% by weight, and even more preferably not less than 2% by weight and not more than 15% by weight relative to the total amount of the water-repellant and oil-repellant coating composition of the present invention.

The present invention also encompasses a transparent film produced from the water-repellant and oil-repellant coating composition described above. When the water-repellant and oil-repellant coating composition of the present invention is formed into a film on a substrate and then is left statically in the air, the composition takes in the moisture contained in the air and thus a hydrolyzable group is hydrolyzed, and then a siloxane bond is formed in the transparent film of the present invention. The resulting transparent film may be further heat dried.

For example, a solution for forming a film prepared by diluting the aforementioned first organic silicon compound (A) and the aforementioned second organic silicon compound (B) with a solvent (C) is stirred at room temperature for a prescribed time and the solution is formed into a film on a substrate and then is left statically at room temperature in the air, and further is heat dried at 50 to 300° C., preferably 100 to 200° C. Thus, the transparent film of the present invention can be produced.

As a method for forming a film on a substrate from a solution for forming a film, a clip coating method, a roll coating method, a bar coating method, a spin coating method, a spray coating method, a die coating method, a vapor deposition method, or the like can be employed appropriately. The thickness of the transparent film is, for example, 1 to 200 nm, preferably 1 to 20 nm.

The transparent film obtained in such a manner has water repellency and oil repellency and is excellent in abrasion resistance. For example, the contact angle of the transparent film of the present invention measured by a θ/2 method with a waterdrop amount of 3 µl on a smooth surface with no irregularities is 90° or more (preferably 100° or more, more preferably 110° or more. The upper is not limited, and 120° or less, for example).

The total light transmittance in accordance with JIS K7136-1 or JIS K7375 of the transparent film of the present invention is preferably 70% or more, more preferably 80% or more, and even more preferably 85% or more.

The substrate on which the transparent film of the present invention is to be formed is not particularly limited and may be made of either an organic material or an inorganic material, and the shape thereof may be either a planar surface or a curved surface or also may be in a three-dimensional structure in which many faces are combined. Examples of the organic material include thermoplastic resins such as acrylic resin, polycarbonate resin, polyester resin, styrene resin, acrylic-styrene copolymerized resin, cellulosic resin, polyolefin resin, polyvinyl alcohol; and thermosetting resins such as phenolic resin, urea resin, melamine resin, epoxy resin, unsaturated polyester, silicone resin, and urethane resin. Examples of the inorganic material include metals such as iron, silicon, copper, zinc, and aluminum, alloys containing such metals, ceramics, and glass.

The substrate may have been subjected to adhesion-facilitating treatment. Examples of the adhesion-facilitating treatment include hydrophilizing treatment such as corona treatment, plasma treatment, and ultraviolet treatment. Moreover, primer treatment with resin, a silane coupling agent, a tetraalkoxysilane, or the like may also be employed.

It is preferred to provide a primer layer between the transparent film and a substrate because durability such as moisture resistance and alkali resistance can thereby be improved more.

Preferred as the primer layer is a layer formed using a composition for forming a primary coat layer comprising a component (D) composed of a compound represented by the following formula (5) and/or a partial hydrolytic condensate thereof,

$$Si(X^2)_4 \qquad (5)$$

in the formula (5), $X^2$ each independently represents a halogen atom, an alkoxy group, or an isocyanate group.

In the above formula (5), $X^2$ is preferably a chlorine atom, an alkoxy group having 1 to 4 carbon atoms, or an isocyanate group, and it is preferred that four $X^2$ are the same.

Specifically, $Si(NCO)_4$, $Si(OCH_3)_4$, $Si(OC_2H_5)_4$, and the like are used preferably as such a compound represented by the formula (5). The component (D) may be used singly or two or more kinds may be used in combination.

The component (D) contained in the composition for forming a primer layer can be a partial hydrolytic condensate of a compound represented by the above formula (5). The partial hydrolytic condensate of the compound represented by the above formula (5) can be produced by applying a common hydrolytic condensation method using an acid catalyst or a base catalyst. It is noted that the degree of condensation (the degree of polymerization) of the partial hydrolytic condensate needs to be as low as the product can be dissolved in a solvent. The component (D) may be a compound represented by the above formula (5), or a partial hydrolytic condensate of a compound represented by the above formula (5), or a mixture of a compound represented by the above formula (5) and a partial hydrolytic condensate thereof, for example, a partial hydrolytic condensate of a compound represented by the above formula (5) containing an unreacted compound represented by the above formula (5). There are commercially available products of a compound represented by the above formula (5) and a partial hydrolytic condensate thereof, and such commercially available products can be used for the present invention.

The composition for forming a primary coat layer comprises the component (D) and a component (E) composed of a compound represented by the following formula (6) (hereinafter sometimes referred to as compound (6)) and/or a partial hydrolytic condensate thereof, or it may be a composition comprising the above component (D) and a partial hydrolytic condensate of the above component (E), which can contain the component (D) and/or the compound (6),

$$(X^3)_3Si-(CH_2)_p-Si(X^3)_3 \qquad (6)$$

in the formula (6), $X^3$ each independently represents a hydrolyzable group or a hydroxy group, and p is an integer of 1 to 8.

The compound represented by the formula (6) is a compound having hydrolyzable silyl groups or silanol groups on both ends thereof with a divalent organic group sandwiched therebetween.

Examples of the hydrolyzable group represented by $X^3$ in the formula (6) include groups or atoms the same as those as the above described $X^2$. In terms of the balance of the stability and the sensitivity to hydrolysis of the compound represented by the above formula (6), an alkoxy group and an isocyanate group are preferred as $X^3$, and an alkoxy group is particularly preferred. As the alkoxy group, alkoxy groups having 1 to 4 carbon atoms are preferred, and a methoxy group or an ethoxy group is more preferred. These are suitably selected according to a purpose of the manufacture, an intended application, or the like, and then used. The plurality of $X^3$ present in the formula (6) may be the same type or different type of groups, and it is preferred that they are the same type of groups in terms of accessibility.

Examples of the compound represented by formula (6) include $(CH_3O)_3SiCH_2CH_2Si(OCH_3)_3$, $(OCN)_3SiCH_2CH_2Si(NCO)_3$, $Cl_3SiCH_2CH_2SiCl_3$, $(C_2H_5O)_3SiCH_2CH_2Si(OC_2H_5)_3$, and $(CH_3O)_3SiCH_2CH_2CH_2CH_2CH_2CH_2Si(OCH_3)_3$. The component (E) may be used singly or two or more kinds may be used in combination.

The component contained in the composition for forming a primer layer may be a partial hydrolytic condensate of the compound represented by the formula (6). The partial hydrolytic condensate of the compound represented by the formula (6) can be produced by the same method as that described for the partial hydrolytic condensate of the compound represented by the following formula (5). The degree of condensation (the degree of polymerization) of the partial hydrolytic condensate needs to be as low as the product can be dissolved in a solvent. The component (E) may be a compound represented by the formula (6), or a partial hydrolytic condensate of a compound represented by the formula (6), or a mixture of a compound represented by the formula (6) and a partial hydrolytic condensate thereof, for example, a partial hydrolytic condensate of a compound represented by the above formula (6) containing an unreacted compound represented by the formula (6). There are commercially available products of a compound represented by the above formula (6) and a partial hydrolytic condensate thereof, and such commercially available products can be used for the present invention.

For the primary coat layer, various polysilazanes capable of obtaining an oxidized film containing a silicon as the main component like as the film obtained from the above formula (5) can be used.

The composition for forming a primer layer usually contains an organic solvent in addition to solid components that serve as constituents of a layer taking into account economy, workability, and easiness of controlling the thickness of a primer layer to be formed. The organic solvent is not particularly limited as long as it can dissolve the solid components contained in the composition for forming a primer layer. Examples of the organic solvent include the same compounds as the solvent to be used for the water-repellant and oil-repellant coating composition of the present invention. The organic solvent is not limited to one type of solvent, and two or more types of solvent differing in polarity, evaporation rate, or the like can be mixed and used. When the composition for forming a primer layer contains a partial hydrolytic condensate or a partial hydrolytic co-condensate, the composition may contain a solvent used for producing the partial hydrolytic condensate or the partial hydrolytic co-condensate.

Moreover, even if the composition for forming a primer layer contains neither a partial hydrolytic condensate nor a partial hydrolytic co-condensate, it is preferred also to incorporate a catalyst such as an acid catalyst, which is the same as that commonly used in a partial hydrolytic condensation reaction in order to promote a hydrolytic co-condensation reaction. Even if the composition contains a partial hydrolytic condensate or a partial hydrolytic co-condensate, it is preferred to incorporate a catalyst in a case where the catalyst used for the production of the partial hydrolytic condensate or the partial hydrolytic co-condensate does not remain in the composition. The composition for forming a primary coat layer may contain water for hydrolytic condensation reaction or a hydrolytic co-condensation reaction of the aforementioned constituents.

As a method for forming a primary coat layer using the composition for forming a primer layer, it is possible to use a method known for an organosilane compound-based surface treating agent. For example, a primary coat layer can be formed by applying a composition for forming a primary coat layer to a surface of a substrate using such a method as brush coating, flow coating, spin coating, dip coating, squeegee coating, spray coating, and hand coating, drying as needed in the atmosphere or in a nitrogen atmosphere, and then curing. The conditions for the curing are controlled appropriately according to the type, concentration, or the like of the composition to be used. The curing of the composition for forming a primer layer may be performed simultaneously with the curing of a composition for forming a water-repellant film.

The thickness of the primer layer is not particularly limited as long as it is a thickness large enough for imparting moisture resistance to a transparent film to be formed on the primer layer, for imparting adhesion with a substrate, and for blocking an alkali or the like released from the substrate.

The transparent film of the present invention can suitably be formed on a display device such as a touch panel display, an optical element, a semiconductor element, a building material, a nanoimprint technology, a solar cell, a window glass of a car or a building, metal parts of cookware, ceramic products such as tableware, automotive parts made of plastics, or the like and therefore is useful industrially. It can also be used for a fishing net, an insect collecting net, a water tank, or the like. Moreover, it can also be used for a kitchen, a bathroom, a washstand, a mirror, items in toilet areas, a chandelier, potteries such as tiles, artificial marble, and indoor facilities such as an air-conditioner. Moreover, it can also be used as antifouling treatment for jigs, inner walls, piping, or the like in factories. It is also suitable for goggles, glasses, helmets, pachinko, fibers, umbrellas, playing tools, soccer balls, or the like. Moreover, it can also be used as an adhesion inhibitor for various wrapping materials such as wrapping materials for foodstuffs, wrapping materials for cosmetics, and interior parts of pots.

The present application claims benefit of the priority based on Japan Patent Application No. 2014-230153 filed on Nov. 12, 2014. The disclosure of the specification of Japan Patent Application No. 2014-230153 filed on Nov. 12, 2014 is incorporated herein by reference in its entirety.

EXAMPLES

The present invention is described more concretely below with reference to examples. The present invention is not limited by the following examples and can be practiced with appropriate modifications which comply with the foregoing and following spirit and such modifications are embraced within the technical scope of the present invention.

A first organic silicon compound (A) represented by the following formula (a) (molecular weight: about 8000) was synthesized using the method described in Synthesis Examples 1 and 2 of JP-A-2014-15609.

[Chemical formula 7]

(a)

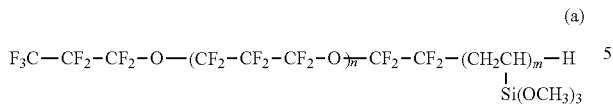

In the above formula (a), n is 43 and m is an integer of 1 to 6.

Example 1

The compound represented by the above formula (a) (hereinafter, compound (a)) as the first organic silicon compound (A), FAS9E ($C_4F_9$—$C_2H_4$—Si—$(OC_2H_5)_3$, boiling point: 241° C., manufactured by Tokyo Kasei Kogyo Co., Ltd.) as the second organic silicon compound (B), and Novec 7200 ($C_4H_9OC_2H_5$, manufactured by 3M Company) as the solvent (C) were mixed and were stirred for a prescribed period of time at room temperature to obtain a water-repellant and oil-repellant coating composition. In the water-repellant and oil-repellant coating composition, the proportion of the first organic silicon compound (A) was 0.03% by mass and the proportion of the second organic silicon compound (B) was 0.07% by mass. The resulting water-repellant and oil-repellant coating composition was dropped onto a glass substrate EAGLE XG manufactured by Corning Incorporated, and the glass substrate was rotated at 3000 rpm for 20 seconds using a spin coater produced by MIKASA Co., Ltd. In addition, heat drying was carried out at 150° C. for 10 minutes to obtain a transparent film on the glass substrate.

Example 2

A transparent film was formed on a glass substrate in the same manner as Example 1 except for that the proportion of the first organic silicon compound (A) was adjusted to 0.05% by mass and the proportion of the second organic silicon compound (B) was adjusted to 0.05% by mass.

Example 3

A transparent film was formed on a glass substrate in the same manner as Example 2 except for that the proportion of the first organic silicon compound (A) was adjusted to 0.1% by mass.

Example 4

A transparent film was formed on a glass substrate in the same manner as Example 3 except for that the proportion of the second organic silicon compound (B) was adjusted to 0.1% by mass.

Example 5

A transparent film was formed on a glass substrate in the same manner as Example 1 except for that FAS13E ($C_6F_{13}$—$C_2H_4$—Si—$(OC_2H_5)_3$, boiling point: 220° C., manufactured by Tokyo Chemical Industry Co., Ltd.) was used as the second organic silicon compound (B).

Example 6

A transparent film was formed on a glass substrate in the same manner as Example 2 except for that FAS13E ($C_6F_{13}$—$C_2H_4$—Si—$(OC_2H_5)_3$, boiling point: 220° C., manufactured by Tokyo Chemical Industry Co., Ltd.) was used as the second organic silicon compound (B).

Comparative Example 1

A transparent film was formed on a glass substrate in the same manner as Example 1 except for that no second organic silicon compound (B) was used.

Comparative Example 2

A transparent film was formed on a glass substrate in the same manner as Example 2 except for that no second organic silicon compound (B) was used.

Comparative Example 3

A transparent film was formed on a glass substrate in the same manner as Example 1 except for that FAS9M ($C_4F_9$—$C_2H_4$—Si—$(OCH_3)_3$, boiling point: 43° C., manufactured by Tokyo Chemical Industry Co., Ltd.) was used as the second organic silicon compound (B).

Comparative Example 4

A transparent film was formed on a glass substrate in the same manner as Example 2 except for that FAS9M ($C_4F_9$—$C_2H_4$—Si—$(OCH_3)_3$, boiling point: 43° C., manufactured by Tokyo Chemical Industry Co., Ltd.) was used as the second organic silicon compound (B).

Comparative Example 5

A transparent film was formed on a glass substrate in the same manner as Example 1 except for that FAS17M ($C_8F_{17}$—$C_2H_4$—Si—$(OCH_3)_3$, boiling point: 80° C., manufactured by Tokyo Chemical Industry Co., Ltd.) was used as the second organic silicon compound (B).

Comparative Example 6

A transparent film was formed on a glass substrate in the same manner as Example 2 except for that FAS17M ($C_8F_{17}$—$C_2H_4$—Si—$(OCH_3)_3$, boiling point: 80° C., manufactured by Tokyo Chemical Industry Co., Ltd.) was used as the second organic silicon compound (B).

Comparative Example 7

A transparent film was formed on a glass substrate in the same manner as Example 2 except for that FAS17M ($C_8F_{17}$—$C_2H_4$—Si—$(OCH_3)_3$, boiling point: 80° C., manufactured by Tokyo Chemical Industry Co., Ltd.) and tetramethoxysilane (Si—$(OCH_3)_4$, boiling point: 122° C., Tokyo Chemical Industry Co., Ltd.) were used as the second organic silicon compound (B); dibutyltin oxide was used as the catalyst; the proportion of FAS17M was adjusted to 0.19% by mass, the proportion of tetraethoxysilane was adjusted to 0.05% by mass, and the proportion of dibutyltin oxide was adjusted to 0.004% by mass; and pentafluorobutane ($CF_3CH_2CF_2CH_3$, manufactured by Tokyo Kasei Kogyo Co., Ltd.) and AK225 (manufactured by Asahi Glass Co., Ltd.) were used in a weight ratio 7:3 as the solvent (C).

Comparative Example 8

A transparent film was formed on a glass substrate in the same manner as Example 1 except for that no first organic silicon compound (A) was used; FAS9M ($C_4F_9$—$C_2H_4$—Si—$(OCH_3)_3$, boiling point: 43° C., manufactured by Tokyo Chemical Industry Co., Ltd.) was used as the second organic silicon compound (B) and the proportion of FAS9M was adjusted to 0.1% by mass.

Comparative Example 9

A transparent film was formed on a glass substrate in the same manner as Example 1 with the exception that no first organic silicon compound (A) was used; FAS9E ($C_4F_9$—$C_2H_4$—Si—$(OC_2H_5)_3$, boiling point: 241° C., manufactured by Tokyo Chemical Industry Co., Ltd) was used as the second organic silicon compound (B) and the proportion of FAS9M was adjusted to 0.1% by mass.

(1) Measurement of Water Contact Angle

Using a DM700 manufactured by Kyowa Interface Science Co., Ltd., a contact angle was measured with a water-drop of 3 μl by a θ/2 method.

(2) Evaluation of Abrasion Resistance

An abrasion test was performed by applying a load of 500 g while keeping an eraser in contact with a sample by using a steel wool tester (manufactured by Daiei Kagaku Seiki MFG. Co., Ltd.) equipped with a MONO one dust CATCH (manufactured by Tombow Pencil Co., Ltd.), and the number of abrasion repeated until the contact angle became initial contact angle minus 15° or less was counted.

The results are shown in Tables 1 to 3.

TABLE 1

| | | Example 1 | Example 2 | Example 3 | Example 4 | Example 5 | Example 6 |
|---|---|---|---|---|---|---|---|
| First Organic Silicon Compound (A) | kind | | | Compound (a) | | | |
| | Concentration (wt %) | 0.03 | 0.05 | 0.1 | 0.1 | 0.03 | 0.05 |
| Second Organic Silicon Compound (B) | kind | | FAS9E | | | FAS13E | |
| | Concentration (wt %) | 0.07 | 0.05 | 0.05 | 0.1 | 0.07 | 0.05 |
| | Boiling Point (° C.) | | | 241 | | | — |
| Catalyst | kind | — | — | — | — | — | — |
| | Concentration (wt %) | — | — | — | — | — | — |
| Solvent (C) | kind | | | Novec 7200 | | | |
| | Concentration (wt %) | 99.9 | 99.9 | 99.85 | 99.8 | 99.9 | 99.9 |
| Contact Angle (°) | | 110 | 112 | 112 | 112 | 109 | 112 |
| Abrasion Resistance (times) | | 1000 | >1000 | >1000 | >1000 | 1000 | >1000 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| First Organic Silicon Compound (A) | kind | | | Compound (a) | | | |
| | Concentration (wt %) | 0.03 | 0.05 | 0.03 | 0.05 | 0.03 | 0.05 |
| Second Organic Silicon Compound (B) | kind | — | — | FAS9M | | FAS17M | |
| | Concentration (wt %) | — | — | 0.07 | 0.05 | 0.07 | 0.05 |
| | Boiling Point (° C.) | — | — | — | | — | |
| Catalyst | kind | — | — | — | — | — | — |
| | Concentration (wt %) | — | — | — | — | — | — |
| Solvent (C) | kind | | | Novec 7200 | | | |
| | Concentration (wt %) | 99.97 | 99.95 | 99.9 | 99.9 | 99.9 | 99.9 |
| Contact Angle (°) | | 110 | 110 | 108 | 111 | 109 | 110 |
| Abrasion Resistance (times) | | 200 | 600 | 100 | 300 | 100 | 400 |

TABLE 3

| | | Comparative Example 7 | Comparative Example 8 | Comparative Example 9 |
|---|---|---|---|---|
| First Organic Silicon Compound (A) | kind | Compound (a) | — | — |
| | Concentration (wt %) | 0.05 | — | — |
| Second Organic Silicon Compound | kind | FAS17M | FAS9M | FAS9E |
| | Concentration (wt %) | 0.19 | 0.1 | 0.1 |

TABLE 3-continued

|  |  | Comparative Example 7 | Comparative Example 8 | Comparative Example 9 |
|---|---|---|---|---|
| (B) 1 | Boiling Point (° C.) | 80 | 43 | 241 |
| Second Organic Silicon Compound | kind | TEOS | — | — |
|  | Concentration (wt %) | 0.05 | — | — |
| (B) 2 | Boiling Point (° C.) | 122 | — | — |
| Catalyst | kind | Dibutyltin Oxide | — | — |
|  | Concentration (wt %) | 0.004 | — | — |
| Solvent (C) | kind | Pentafluorobutane/AK225 (7:3) | Novec 7200 | |
|  | Concentration (wt %) | 99.71 | 99.9 | 99.9 |
| Contact Angle (°) |  | 119 | 48 | 43 |
| Abrasion Resistance (times) |  | 300 | <100 | <100 |

In Examples 1 to 6, since the above-mentioned compound (a) in which a fluorine-containing group having a perfluoroalkyl group or a perfluoropolyether group on a free end side and a hydrolyzable group were bonded to a silicon atom, and a compound in which a carbon fluoride-containing group and a hydrolyzable group were bonded to a silicon atom and which had a boiling point of 100° C. or more (specifically, FAS9E or FAS13E) were used, the products were good in water repellency and also were excellent in abrasion resistance.

On the other hand, in Comparative Examples 1 and 2 using the compound (a) only and Comparative Examples 3 to 7 using the compound (a) and a compound in which a carbon fluoride-containing group and a hydrolyzable group were bonded to a silicon atom and which had a boiling point of less than 100° C. (specifically, FAS9M or FAS17M) as the second organic silicon compound, the abrasion resistance was insufficient. Moreover, in Comparative Examples 8 and 9 using no compound (a) and using the above-mentioned FAS9M or FAS9E only, both water repellency and abrasion resistance were insufficient.

The invention claimed is:

1. A water-repellant and oil-repellant coating composition comprising;
   a first organic silicon compound (A) in which a fluorine-containing group having a perfluoroalkyl group on the free end side thereof and a hydrolyzable group are bonded to a silicon atom thereof, and
   a second organic silicon compound (B) that is a compound in which a carbon fluoride-containing group and a hydrolyzable group are bonded to a silicon atom thereof and that has a vapor pressure at 100° C. of 1 atm or less,
   wherein the first organic silicon compound (A) is represented by the following formula (3) or (4):

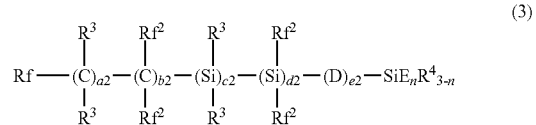

(3)

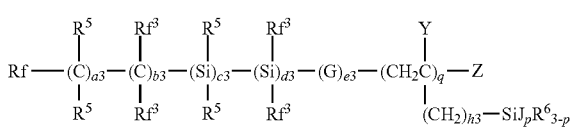

(4)

in the formula (3),
Rf represents a fluorine atom or an alkyl group having 1 to 20 carbon atoms and is substituted with one or more fluorine atoms,
$Rf^2$ each independently represents a fluorine atom or an alkyl group having 1 to 20 carbon atoms and is substituted with one or more fluorine atoms,
$R^3$ each independently represents a hydrogen atom or an alkyl group having 1 to 4 carbon atoms,
$R^4$ each independently represents an alkyl group having 1 to 20 carbon atoms,
D each independently represents —O—, —COO—, —OCO—, —NR—, —NRCO—, or —CONR—, wherein R represents a hydrogen atom, an alkyl group having 1 to 4 carbon atoms, or a fluorine-containing alkyl group having 1 to 4 carbon atoms,
E each independently represents a hydrolyzable group,
a2, c2, d2 and e2 are each independently an integer of not less than 0 and not more than 600, b2 is an integer of not less than 20 and not more than 600, and the sum total of a2, b2, c2, d2 and e2 is not less than 20,
n is an integer of not less than 1 and not more than 3,
each of repeating units enclosed in parentheses with a2, b2, c2, d2, or e2 added thereto is present in arbitrary order in the formula (3),
in the formula (4),
Rf represents a fluorine atom or an alkyl group having 1 to 20 carbon atoms and is substituted with one or more fluorine atoms,
$Rf^3$ each independently represents a fluorine atom or an alkyl group having 1 to 20 carbon atoms and is substituted with one or more fluorine atoms,
$R^5$ each independently represents a hydrogen atom or an alkyl group having 1 to 4 carbon atoms,
$R^6$ each independently represents an alkyl group having 1 to 20 carbon atoms, G each independently represents —O—, —COO—, —OCO—, —NR—, —NRCO—, or —CONR—, wherein R represents a hydrogen atom, an alkyl group having 1 to 4 carbon atoms, or a fluorine-containing alkyl group having 1 to 4 carbon atoms, J each independently represents a hydrolyzable group, Y each independently represents a hydrogen atom or an alkyl group having 1 to 4 carbon atoms, Z represents a hydrogen atom or a halogen atom, a3, c3, d3 and e3 are each independently an integer of not less than 0 and not more than 600, b3 is an integer of not less than 20 and not more than 600, and the sum total of a3, b3, c3, d3 and e3 is not less than 20, h3 is an integer of not less than 0 and not more than 2, p is an integer of not less than 1 and not more than 3, q is an integer of not less than 1 and not more than 10, each of repeating units enclosed in parentheses with a3, b3, c3, d3, or e3 added thereto is present in arbitrary order in the formula (4), the second organic silicon compound (B) is represented by the following formula (1):

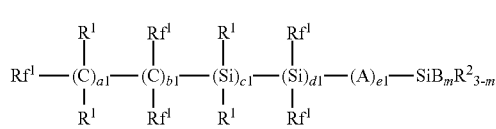

in the formula (1), $Rf^1$ each independently represents a fluorine atom or an alkyl group substituted with one or more fluorine atoms and having 1 to 20 carbon atoms, $R^1$ each independently represents a hydrogen atom or an alkyl group having 1 to 4 carbon atoms, $R^2$ each independently represents an alkyl group having 1 to 20 carbon atoms, A each independently represents —O—, —COO—, —OCO—, —NR—, —NRCO—, or —CONR—, wherein R represents a hydrogen atom, an alkyl group having 1 to 4 carbon atoms, or a fluorine-containing alkyl group having 1 to 4 carbon atoms, B represents an ethoxy group, a1, b1, c1, d1, and e1 each independently are an integer of not less than 0 and not more than 100, each of repeating units enclosed in parentheses with a1, b1, c1, d1, or e1 added thereto is present in arbitrary order in the formula (1), and the sum total of a1, b1, c1, d1, and e1 is 100 or less, m is an integer of not less than 1 and not more than 3.

2. The water-repellant and oil-repellant coating composition according to claim 1, wherein the fluorine-containing group of the first organic silicon compound (A) contains a hydrocarbon group.

3. The water-repellant and oil-repellant coating composition according to claim 2, wherein the molecular length of the second organic silicon compound (B) is shorter than the molecular length of the first organic silicon compound (A).

4. The water-repellant and oil-repellant coating composition according to claim 3, wherein the longest straight chain part of the carbon fluoride-containing group of the second organic silicon compound is shorter in the number of atoms than the longest straight chain part of the fluorine-containing group of the first organic silicon compound (A).

5. The water-repellant and oil-repellant coating composition according to claim 4, wherein the mass ratio of the second organic silicon compound (B) to the first organic silicon compound (A) is 0.1 to 50.

6. The water-repellant and oil-repellant coating composition according to claim 5, comprising a solvent (C).

7. The water-repellant and oil-repellant coating composition according to claim 6, wherein the total amount of the first organic silicon compound (A) and the second organic silicon compound (B) is 0.001 to 20% by mass relative to the total amount of the first organic silicon compound (A), the second organic silicon compound (B), and the solvent (C).

8. The water-repellant and oil-repellant coating composition according to claim 7, wherein the solvent (C) is a fluorine-based solvent.

9. A transparent film produced from the water-repellant and oil-repellant coating composition according to claim 8.

10. The water-repellant and oil-repellant coating composition according to claim 1, wherein the molecular length of the second organic silicon compound (B) is shorter than the molecular length of the first organic silicon compound (A).

11. The water-repellant and oil-repellant coating composition according to claim 10, wherein the longest straight chain part of the carbon fluoride-containing group of the second organic silicon compound (B) is shorter in the number of atoms than the longest straight chain part of the fluorine-containing group of the first organic silicon compound (A).

12. The water-repellant and oil-repellant coating composition according to claim 1, wherein the mass ratio of the second organic silicon compound (B) to the first organic silicon compound (A) is 0.1 to 50.

13. The water-repellant and oil-repellant coating composition according to claim 1, comprising a solvent (C).

14. The water-repellant and oil-repellant coating composition according to claim 13, wherein the total amount of the first organic silicon compound (A) and the second organic silicon compound (B) is 0.001 to 20% by mass relative to the total amount of the first organic silicon compound (A), the second organic silicon compound (B), and the solvent (C).

15. The water-repellant and oil-repellant coating composition according to claim 13, wherein the solvent (C) is a fluorine-based solvent.

16. A transparent film produced from the water-repellant and oil-repellant coating composition according to claim 1.

* * * * *